(12) United States Patent
Crisp

(10) Patent No.: US 10,552,715 B2
(45) Date of Patent: Feb. 4, 2020

(54) PERSONALIZED PRINTED PRODUCT AND RELATED METHOD

(71) Applicant: Jackson L. Crisp, Moorcroft, WY (US)

(72) Inventor: Jackson L. Crisp, Moorcroft, WY (US)

( * ) Notice: Subject to any disclaimer, the term of this patent is extended or adjusted under 35 U.S.C. 154(b) by 117 days.

(21) Appl. No.: 13/652,446

(22) Filed: Oct. 15, 2012

(65) Prior Publication Data
US 2014/0104656 A1   Apr. 17, 2014
US 2019/0197371 A9   Jun. 27, 2019

Related U.S. Application Data

(60) Provisional application No. 61/589,387, filed on Jan. 22, 2012, provisional application No. 61/632,397, filed on Oct. 15, 2011.

(51) Int. Cl.
*G06K 15/00* (2006.01)
*G06K 15/02* (2006.01)

(52) U.S. Cl.
CPC ................... *G06K 15/18* (2013.01)

(58) Field of Classification Search
None
See application file for complete search history.

(56) References Cited

U.S. PATENT DOCUMENTS

| | | | | |
|---|---|---|---|---|
| 4,671,004 A | * | 6/1987 | Berg | ........... 40/592 |
| 8,150,156 B2 | * | 4/2012 | Geva | ........... G06F 17/243 |
| | | | | 382/175 |
| 2002/0023001 A1 | * | 2/2002 | McFarlin et al. | ........... 705/14 |
| 2002/0036654 A1 | * | 3/2002 | Evans | ........... G06F 17/243 |
| | | | | 715/744 |
| 2002/0198892 A1 | * | 12/2002 | Rychel | ........... G06Q 10/087 |
| 2004/0148830 A1 | * | 8/2004 | Baskerville | ........... G09F 7/04 |
| | | | | 40/600 |
| 2005/0087895 A1 | * | 4/2005 | Franko, Sr. | ........... 264/1.6 |
| 2007/0057050 A1 | * | 3/2007 | Kuhno | ........... G02B 27/62 |
| | | | | 235/383 |

(Continued)

OTHER PUBLICATIONS

"Uline Laser Labels—White, 2 5/8 x 1" S-5042, Accessed on Aug. 5, 2019, 2 Pages.
"Easy Peel White Mailing Labels", Apr. 2008, 2 Pages.

*Primary Examiner* — Dung D Tran
(74) *Attorney, Agent, or Firm* — Goff IP Law PLLC; Jared Goff

(57) ABSTRACT

Disclosed is an advertisement product and method that allows a user of said product to create durable, weatherproof and professional signage and similar type product, more specifically advertisement signage.

A single said advertisement product and related methods provide the user with several custom and/or standard signage creation options; whereby signs are created by printing predefined and in some cases customizable data group data to durable sign stock.

Another disclosed and said advertisement product and method provides the user with an option of creating custom sized and printed labels for application to specific areas of related third party advertisement products, displays, apparatuses and signage, and in doing so creating a professional looking and legible advertisement display products.

Further disclosed is a method and process by which system linked contact information as applied to said created advertisement products make available powerful system services to aid in advertising processes.

20 Claims, 18 Drawing Sheets

(56) References Cited

U.S. PATENT DOCUMENTS

2007/0201093 A1* 8/2007 Johnson, II ......... G06F 16/9554
  358/1.18
2007/0252378 A1* 11/2007 Chambers ....................... 283/81
2010/0324997 A1* 12/2010 Evans ........................ 705/14.69

* cited by examiner

FIG. 5G-1
FIG. 5G-2
FIG. 5G-3

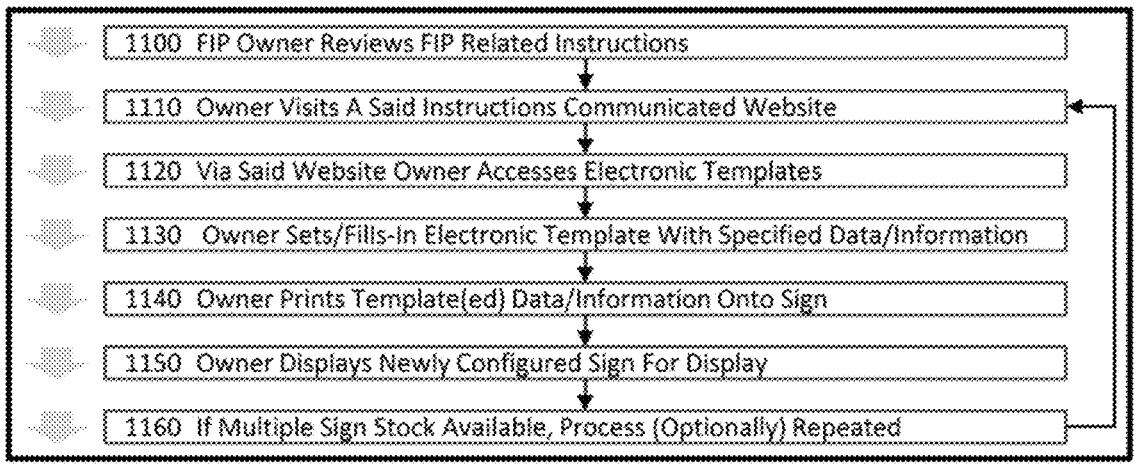

FIG. 11

```
Instructions:

1. Decide the SIGN type you'd like create, e.g. FOR SALE, FOR RENT, etc

2. Remove corresponding LABEL and adhere it to SIGN heading area.

3. Add your information to sign information placement area >> Then display SIGN
```

FIG. 12

```
Instructions:

1. Visit www.TinkTell.com

2. Enter AD PRODUCT related ELECTRONIC TEMPLATE Group-ID >> 98812

3. Select ELECTRONIC TEMPLATE for print, providing information as required

4. Load LABEL STOCK into your printer, LABEL side up

5. Print ELECTRONIC TEMPLATE DATA onto LABEL STOCK

6. Remove LABEL(s) and apply to SIGN placement area(s)

7. >> Display SIGN
```

FIG. 13

Instructions:
1. Visit www.TinkTell.com
2. Enter the UPC CODE of the sign that you would like to create custom labels for
3. Select your ELECTRONIC TEMPLATE for print, providing information as required
4. Load LABEL STOCK into your printer - LABEL side up
5. Print ELECTRONIC TEMPLATE DATA To LABEL STOCK
6. Carefully cutout LABEL areas as indicated by the cut-here borders
7. Remove LABEL backing and apply LABEL to designated SIGN placement area
8. >> Display SIGN

*FIG. 14*

Instructions:
1. Visit www.TinkTell.com
2. Search site available ELECTRONIC [SIGN] TEMPLATES
3. Select your ELECTRONIC TEMPLATE for print, providing information as required
4. Load SIGN STOCK into printer and print ELECTRONIC TEMPLATE DATA thereto
5. >> Display SIGN

*FIG. 17B*

PERSONALIZED PRINTED PRODUCT AND RELATED METHOD

RELATED APPLICATIONS

The present application is an international application claiming priority from, U.S. Provisional Application No. 61/589,387, filed Jan. 22, 2012, entitled A FOR-DISPLAY ADVERTISEMENT PRODUCT AND METHOD, of which is incorporated herein by reference.

The present application is an international application claiming priority from, U.S. Provisional Application No. 61/632,397, filed Oct. 15, 2011, entitled SYSTEM LINKED FOR INFORMATION PRODUCT INCLUDING DISTRIBUTION, MARKETING AND ADVERTISING METHODS, of which is incorporated herein by reference.

FIELD OF THE INVENTION

The present invention is in the field of advertisement products such as AD SIGNS (i.e. FOR SALE SIGNS, GARAGE SALE SIGNS, FOR RENT SIGNS, etc.), more specifically the invention makes available an advertisement product (or AD PRODUCT) and related method by which a user can quickly create customized and professional looking SIGNS and similar type products.

BACKGROUND OF THE INVENTION

Typically, when a user wants to advertise an item/event using an AD SIGN (e.g. FOR RENT SIGNS, FOR SALE SIGNS, GARAGE SALE SIGNS, FOR INFORMATION SIGNS, ADVERTISEMENT SIGNS, etc.) and/or similar product there are few options available, OPTION (1), a create-it-yourself website is looked-up and utilized to create an AD SIGN online, where next said sign can be printed to paper using a local printer; OPTION (2), a create-it-yourself website is looked-up and used to create an AD SIGN, to next be remotely manufactured and shipped to user for use; OPTION (3), a standard retail store AD SIGN is purchased from a retailer and configured by a user with custom information; OPTION (4), an AD SIGN is purchased online and shipped to related user, where it can be configured with custom (contact) information; and OPTION (5), a handmade AD SIGN is created by a user, typically using available materials.

There are many DISADVANTAGES with the previously stated/existing OPTIONS, wherein the main disadvantage with OPTIONS (2-5) is the time involved by the user to first obtain the AD SIGN, time delays due to design/build/shipping related issues; as related to OPTION (1), unless the user has in-depth materials knowledge and knows where to obtain (weatherproof) printable durable sheet material, users typically print the AD SIGN to standard and easily damaged paper, where additionally a user could take several extra steps and time to laminate said printed AD SIGN, however this solution is neither cost and/or time effective; as related to OPTION (2), this option can be costly after you factor in the made-to-order manufacturing process, materials and shipping, it is also time consuming in that the user, as a standard, is forced to wait for delivery of said AD SIGN before said sign can be used; as related to OPTIONS (3-4), since the AD SIGN is standard, the user is typically required to manually apply custom information to the AD SIGN, a process that can be both time consuming and costly, due to the time involved by said user to clearly and legible configure said AD SIGN with customized (contact) information, a process achieved by the application of expensive stick-on numerals/letters and/or by information being directly scribed onto said AD SIGN, resulting in a customization process that often produces an unprofessionally made and hard to read AD SIGN; as related to OPTION (5), this option is very time consuming and costly due to the time and/or materials involved to create said AD SIGN, also typically providing unprofessional results.

The current invention makes available a retail-ready AD PRODUCT and related method from which a user can instantly create custom (weatherproof/durable/professional) AD SIGNS and similar type advertisement products.

DISCUSSION OF KNOWN ART

Initial search, no similar art found. Further search required.

OBJECTS OF THE INVENTION

It is a primary object of the present invention to make available an AD PRODUCT and method that allows users thereof to instantly create a custom (printed), professional, durable and/or weather/water proof AD SIGN made immediately available for use; wherein some invention embodiments, said custom printed information includes system linked contact information, making available powerful and helpful services when contacted.

It is an object of the present invention to make available an AD PRODUCT and method that allows users thereof to instantly create a custom (printed), professional, durable and/or weather/water proof printed LABEL, correctly sized as such so as to assure proper application onto a third party standard AD SIGN related information placement area(s), third party AD SIGNS such as, FOR SALE SIGNS, FOR LEASE SIGNS, FOR RENT SIGNS, GARAGE SALE SIGNS, FOR INFORMATION SIGNS, etc; wherein some invention embodiments, said custom printed information includes system linked contact information, making available powerful and helpful services when contacted.

SUMMARY OF THE INVENTION

The forgoing objects have been met in the present invention wherein an advanced, retail ready AD PRODUCT and method that allow a user to instantly create a professional, durable and customized AD SIGN, of which a system linked version also known as a type of FIP, is now made available.

BRIEF DESCRIPTION OF THE DRAWINGS

The above and further objects, features and advantages of the present invention will be more fully understood from the following description taken with the accompanying drawings in which several of the drawings represents an embodiment or a component of an embodiment of the present invention.

FIGS. 5G-1 through 5G-3 depict a process where a USER first enters (looks-up) a SIGN related UPC code to a system via a webpage form (as shown in FIG. 5G-1), next being presented with said SIGN related ELECTRONIC TEMPLATES in which to select from (as shown in FIG. 5G-2), next entering phone numbers to webpage form (as shown in FIG. 5G-3), followed by submitting the form in order to print said phone number to available LABEL STOCK for application to a SIGN (as shown in FIG. 5C)

FIG. 11 depicts process steps as related to FIGS. 9 and 10.

FIG. 12 depicts AD PRODUCT related instructions as could be related to FIGS. 1 and 2.

FIG. 13 depicts AD PRODUCT related instructions as could be related to FIGS. 3 and 4.

FIG. 14 depicts AD PRODUCT related instructions as could be related to FIG. 5.

FIG. 15 depicts AD PRODUCT related instructions as could be related to FIGS. 9 and 10.

FIG. 18A depicts said AD PRODUCT and FIG. 18B depicts said standard (retail store) signage plan-o-gram display.

DETAILED DESCRIPTION

The following paragraphs describe in detail several invention embodiments, also called advertisement products or simply AD PRODUCTS, ideally made available through retail related channels/stores. As depicted in FIGS. 3-5 & 9-10, each related AD PRODUCT typically contain instructions and (intended for print) printable media, where said media typically consist of printable SIGN STOCK material and/or printable LABEL STOCK material; whereupon obtaining said AD PRODUCT a USER would then access a related (customizable/standard) ELECTRONIC TEMPLATE, next printing said TEMPLATE related data to said SIGN/LABEL STOCK for advertisement/display purposes; wherein said printed SIGN STOCK would typically be intended for mount and display; and wherein said printed LABEL STOCK would typically be intended for application to surfaces such as SIGNS, advertisement display products/items, windows, walls, etc.

Invention ADVANTAGES as related to an AD PRODUCT that is used to create printed SIGNS (similar to those depicted in FIGS. 9-10) include, ADVANTAGE (1), said AD PRODUCT can be mass produced and stocked for purchase in retail store locations, making it easy and convenient for a potential USER to acquire; ADVANTAGE (2), said AD PRODUCT related SIGN STOCK can be made from durable weather/water/chemical proof sheet/film/plastic (ink steadfist) material, allowing a USER to create durable SIGN(s); ADVANTAGE (3), said SIGN STOCK can be sized and engineered as such so as to be printable by a standard home/office printer, allowing a USER the option of locally and instantly creating SIGN(s); ADVANTAGE (4), said SIGN STOCK can be made available in clear and/or in any number of colors/patterns, allowing a USER the option of creating a wide variety and styles of printed SIGN(s); ADVANTAGE (5), said SIGN STOCK can be blank (free of graphics) and/or can include pre-configured graphics, art, text, pictures, etc., again providing a USER with a wide variety of printed SIGN options; ADVANTAGE (6), the number of potential ELECTRONIC TEMPLATES of both standard and/or customizable are many, with related and printed data varying in any one too many aspects, including, textual, graphical, image type, location, arrangement, configuration, etc., again providing a USER with options to create a wide variety of printed SIGNS; ADVANTAGE (7), said AD PRODUCTS provide a USER with an option of instantly creating customizable, crisp, clear, legible, durable and professional looking SIGNS; ADVANTAGE (8), a single and said AD PRODUCT provides a USER with options of creating any one of many printed SIGNS, of similar and/or different design.

Printed LABEL STOCK (as depicted in FIGS. 3-5, 9-10) have similar ADVANTAGES to those of printed SIGN STOCK, but additionally can be applied to applicable objects, items, displays, products, surfaces (e.g. signs, windows, walls, etc.), etc.

Figure 1A:
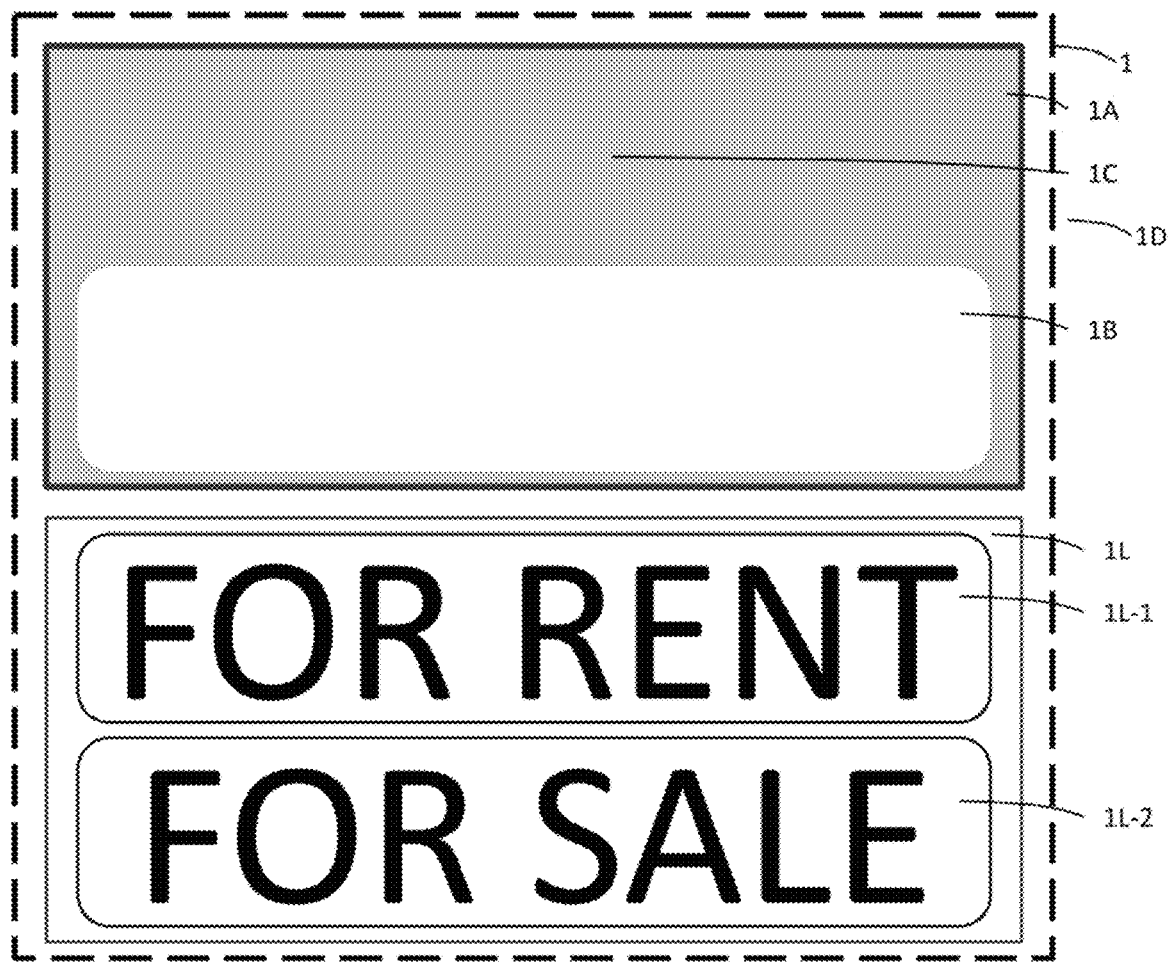
FIG. 1A depicts an AD PRODUCT bundle, comprising an AD SIGN configured with a heading and information area; and LABEL STOCK configured with (2) peel away PRE-PRINTED LABELS, each containing a sign heading type; wherein FIG. 1B one of said peel away labels is adhered to said sign in said information area.
Figure 1B:
Figure 6:
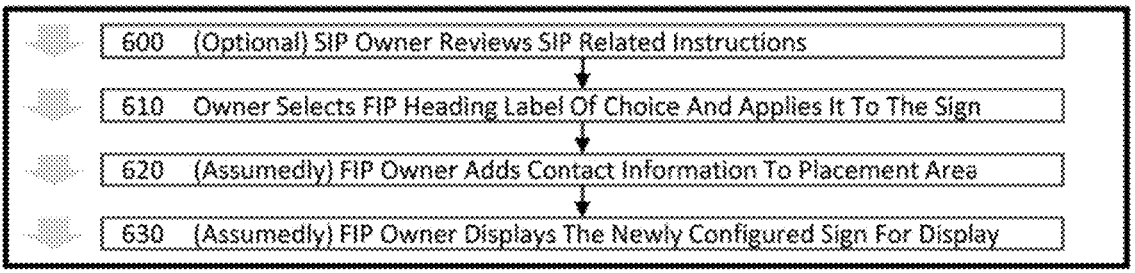
FIG. 6 depicts process steps as related to FIGS. 1 and 2.

FIG. 1A, shows an AD PRODUCT 1 bundle, comprising SIGN STOCK 1A, configured with HEADING AREA 1C and AD AREA 1B; and preprinted LABEL STOCK 1L, configured with a FOR RENT peel-away PRE-PRINTED LABEL 1L-1 and FOR SALE peel-away PRE-PRINTED LABEL 2L-2; wherein (as depicted in FIG. 6) USER 500 in STEP 600, preferably reads (optionally available) INSTRUCTIONS 1D, which in STEP 610, instruct USER 500 to remove one of said peel-away pre-printed labels, placing it into HEADING AREA 1C (as depicted in FIG. 1B); wherein STEP 620, USER 500 would place/scribe custom information (e.g. contact info, advertisement info, etc) into AD AREA 2B; wherein STEP 630, USER 500 then displays assembled AD PRODUCT 1 or AD SIGN 1Z for advertisement purposes. AD PRODUCT 1 provides a practical alternative to a USER in that it provides an option to create any one of many SIGNS using a single AD PRODUCT. AD PRODUCT 1 is non-limiting in the number/type of pre-printed heading labels (e.g. GARAGE SALE, YARD SALE, FOR INFORMATION, etc) and SIGN STOCK pieces.

Figure 2A:
FIG. 2A depicts an AD PRODUCT bundle, comprising an AD SIGN configured with a heading and information area; and LABEL. STOCK configured with (2) clear peel-away PRE-PRINTED LABELS, each containing a reverse-image printed sign heading type; wherein FIG. 2B one of said peel away labels is adhered to said AD SIGN in said information area.
Figure 2B:

FIG. 2A, shows an AD PRODUCT 2 with similar methods and processes used as those of FIG. 1, but different in that peel-away PRE-PRINTED LABELS 2L-1 and 2L-2 are fabricated from transparent material and instead of being configured with standard printed text said LABELS are configured with negatively printed text, a process by which the background of the text is printed as opposed to the text characters themselves, where when LABEL 2L-1 is applied to SIGN STOCK 2A, as shown in FIG. 2B, where the BACKGROUND AREA 2C, as seen through the said transparent non-printed text area, appears as the text color. In a preferred embodiment, said BACKGROUND AREA 2C surface could be reflective and/or be made from reflective material, so as to make said background outlined text (along with any uncovered background area) appear reflective when configured SIGN STOCK 2A (as seen in FIG. 28) as displayed in the dark is lit by an external light source.

Figure 3A:
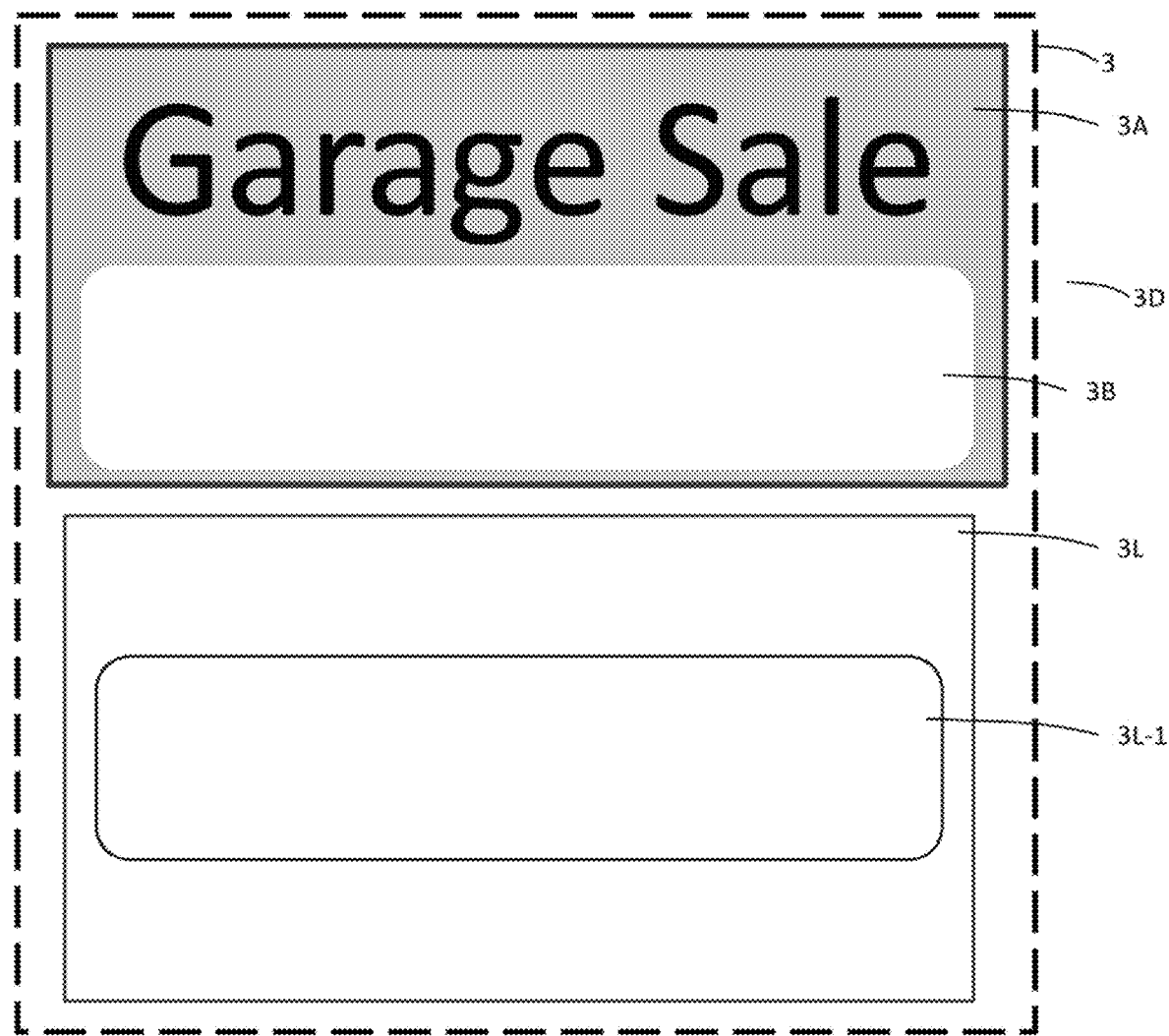
FIG. 3A depicts an AD PRODUCT bundle, comprising an AD SIGN configured with an information area; and LABEL STOCK configured with one (blank) peel away LABEL; wherein FIG. 3B said peel away LABEL is applied to AD SIGN, said LABEL now configured with a (printed text) DATA GROUP.
Figure 3B:
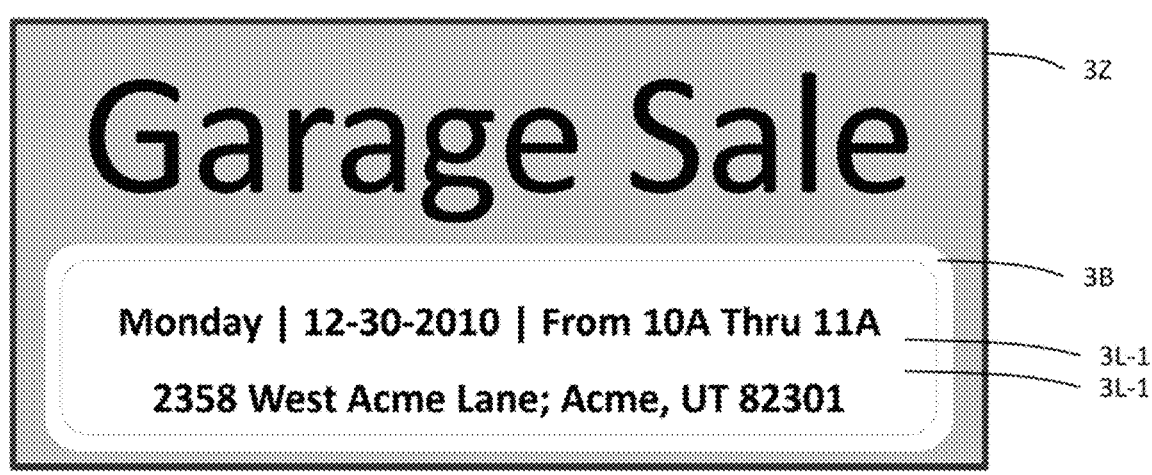
Figure 7:
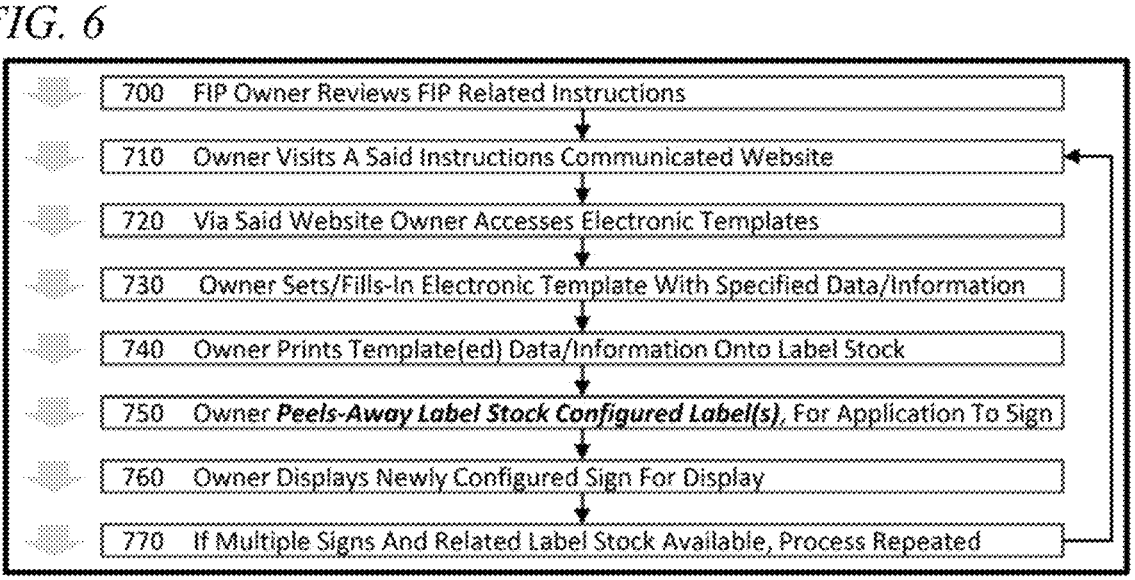
FIG. 7 depicts process steps as related to FIGS. 3 and 4.

FIG. 3A, shows an AD PRODUCT 3 bundle, comprising SIGN STOCK 3A, configured with AD AREA 3B; and LABEL STOCK 3L configured with LABEL 3L-1; where, as depicted in FIG. 7, USER 500 in STEP 700, reads available INSTRUCTIONS 3D, which in STEP 710, instruct USER 500 to look-up a provided web-address related webpage; wherein STEP 720, said webpage allows USER 500 to access at least one AD PRODUCT 3 related ELECTRONIC TEMPLATE, selecting one; wherein STEP 730, USER 500 sets/enters general/custom (contact) data to said ELECTRONIC TEMPLATE; wherein STEP 740, USER 500 loads one sheet of LABEL STOCK 3L to a preferably local printer and prints said ELECTRONIC TEMPLATE related DATA GROUP to LABEL 3L-1; wherein STEP 750, USER 500 peels-away now printed LABEL 3L-1 next applying it to AD AREA 3B, as shown in FIG. 3B; wherein STEP 760, USER 500 then displays assembled AD PRODUCT 3 or newly configured AD SIGN 3Z for advertisement purposes; in (an optional) STEP 770, if AD PRODUCT 3 contained multiple SIGN/LABEL STOCK sheets, STEPS 700 thru 770 could then be repeated, creating additional AD SIGNS.

Figure 4A:
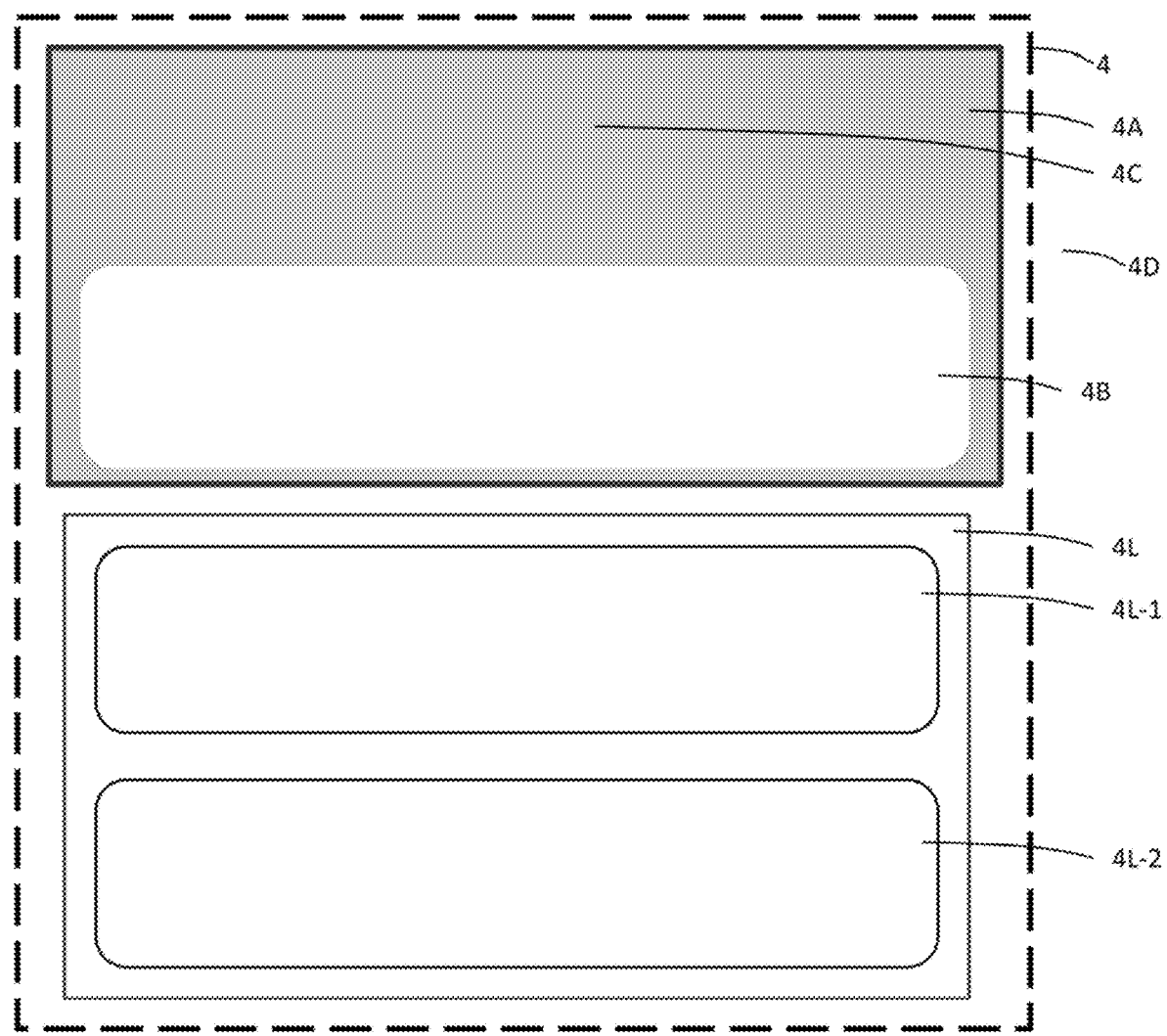
FIG. 4A depicts an AD PRODUCT bundle, comprising an AD SIGN configured with a heading and an information area; and LABEL STOCK configured with two blank peel away LABELS; wherein FIG. 4B said peel away labels are applied to AD SIGN, said LABELS now configured with a (printed text) DATA GROUP.
Figure 4B:
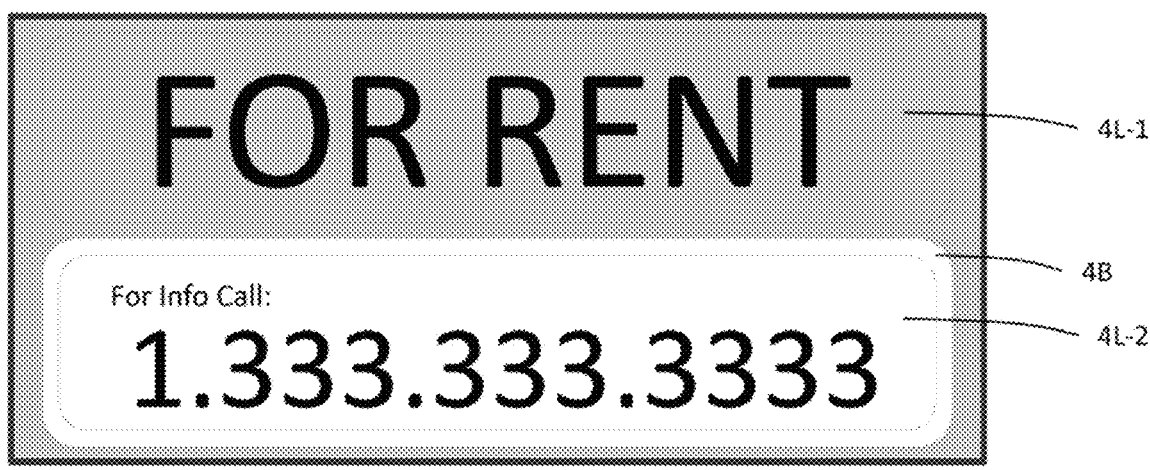

FIG. 4A, shows an AD PRODUCT 4 bundle, comprising SIGN STOCK 4A, configured with a HEADING AREA 4C and AD AREA 4B; and LABEL STOCK 4L, configured with peel-away LABELS 4L-1 & 4L-2; wherein, steps similar to those depicted in FIG. 3 apply to FIG. 4, but differ in that LABEL STOCK 4L is configured with two peel-away labels as opposed to one, and the related ELECTRONIC TEMPLATE allows USER 500 the option to set-for-print SIGN header data (e.g. FOR SALE, GARAGE SALE, YARD SALE, FOR RENT, FOR INFO) as seen in FIG. 41, where now printed LABELS 4L-1 & 4L-2, containing custom contact information, is applied to SIGN STOCK 4A.

Figure 5A:
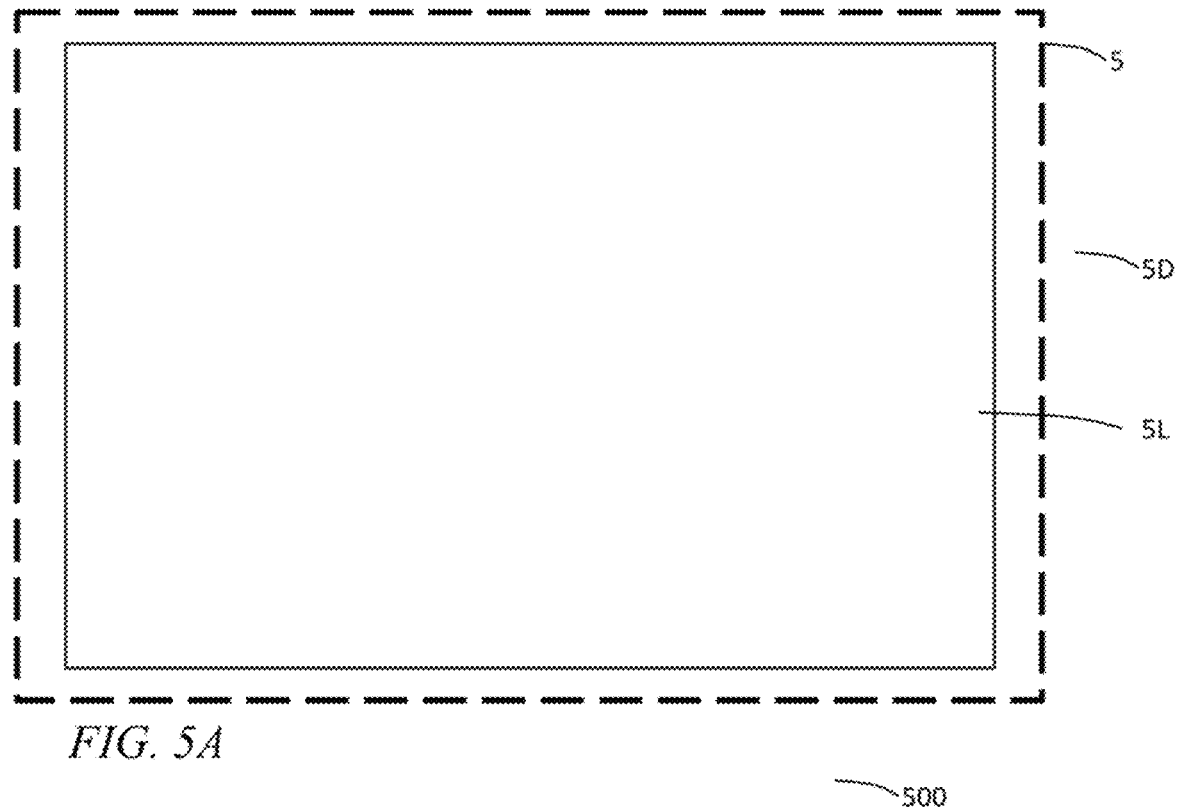
FIG. 5A depicts an AD PRODUCT bundle, comprising LABEL STOCK; wherein FIG. 5B one of said LABEL STOCK related sheets is now configured with (3) DATA GROUPS, each of a type phone number; wherein FIG. 5C one of said LABEL STOCK related sheet is now configured with (4) DATA GROUPS, consisting of (2) phone numbers, a portion of each number printed in each of (2) data-group outlined areas; and wherein FIG. 5D one of said LABEL STOCK related sheets is now configured with (4) DATA GROUPS, consisting of (1) phone number with a portion of said number printed in (2) data-group outlined areas, and (1) web address also with a portion of said address printed in (2) data-group outlined areas; and where
Figure 5B:
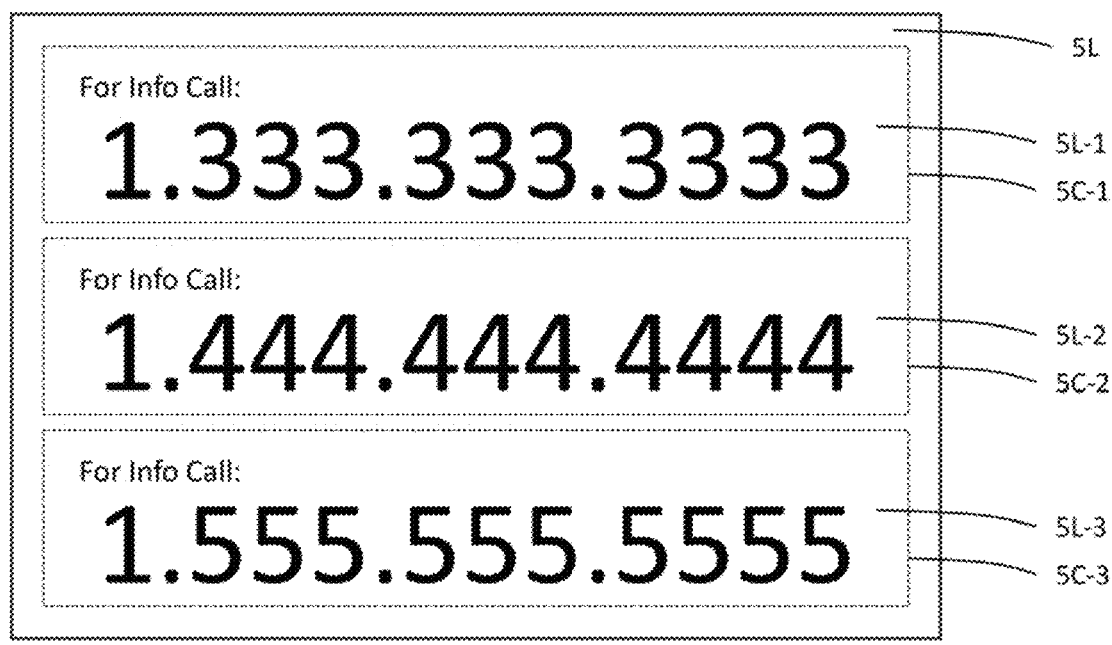
FIG. 5E shows an AD SIGN with a FIG. 5B cutaway DATA GROUP portion of LABEL STOCK (label backing removed) applied thereto; and where
FIG. 5F shows an AD SIGN with FIG. 5C cutaway DATA GROUP portion of LABEL STOCK (label backing removed) applied thereto; and where
FIG. 5G shows an AD SIGN with FIG. 5D cutaway DATA GROUP portions of LABEL STOCK (label backing removed) applied thereto.
Figure 5C:
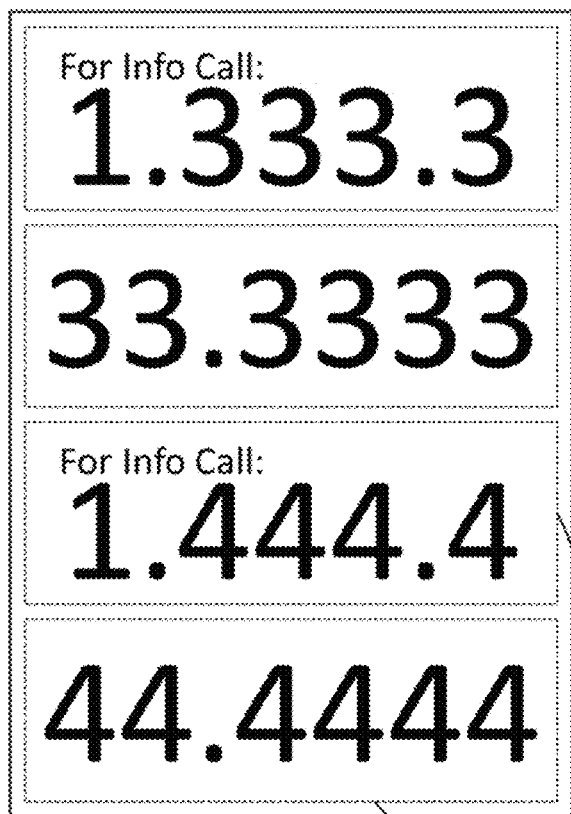
Figure 5D:
Figure 5E:
Figure 8:
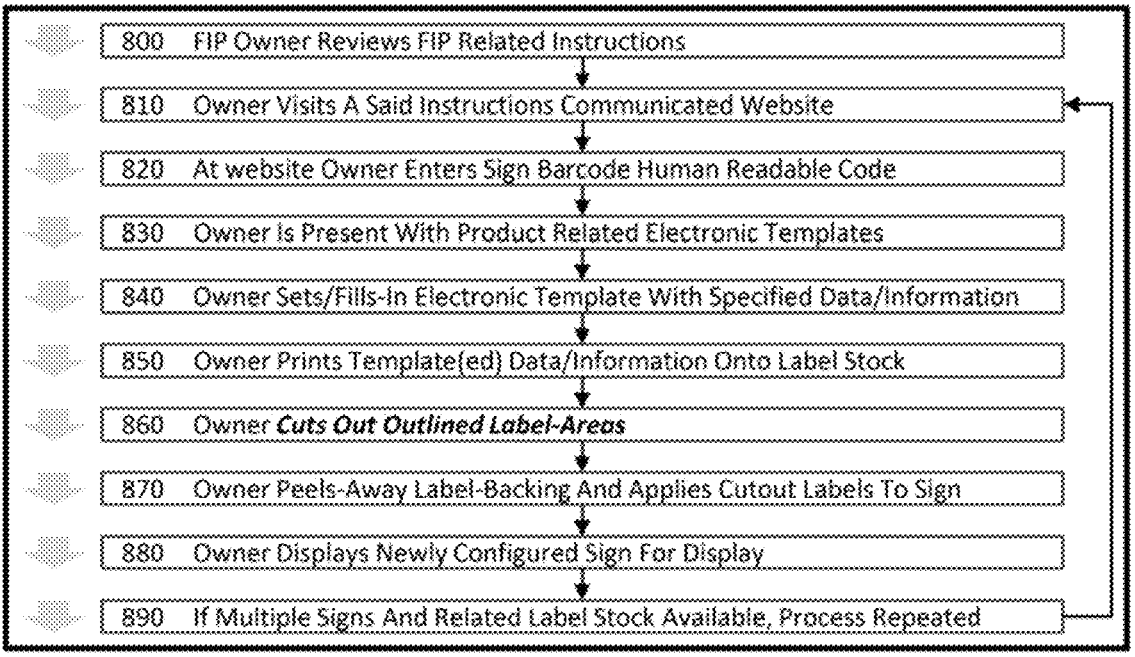
FIG. 8 depicts process steps as related to FIG. 5.

FIG. 5A, shows an AD PRODUCT 5 bundle (as similarly depicted in FIG. 16), comprising LABEL STOCK 5L; whereas depicted in FIG. 8, USER 500 in STEP 800, reads available INSTRUCTIONS 5D, which in STEP 810, instruct USER 500 to look-up a provided web-address related webpage; wherein STEP 820, upon USER 500 entering a qualifying (previously system entered) AD SIGN 5Y related UPC CODE 5X (seen in FIG. 5D) to said system (via said webpage) at least one AD SIGN 5Y (previously system designed/set) related ELECTRONIC TEMPLATE is made available; wherein STEP 830, USER 500 selects one of said and previously presented ELECTRONIC TEMPLATES; wherein STEP 840, USER 500 sets/enters general/custom (contact) data to said ELECTRONIC TEMPLATE; wherein STEP 850, USER 500 loads one sheet of LABEL STOCK 3L to a preferably local printer and prints said ELECTRONIC TEMPLATE related FIG. 5B depicted DATA GROUP(s) 5L-1, 5L-2 and 5L-3 onto LABEL STOCK 5L; wherein STEP 860, USER 500, using printed CUT HERE LINE 5C-2 as reference, cuts out printed DATA GROUP 5L-2 from LABEL STOCK 5L; wherein STEP 870, USER 500 peels away said DATA GROUP 5L-2 cut-away LABEL STOCK 5L portion backing, next applying the LABEL to AD SIGN 5Y, as shown in FIG. 5E, where said cut-away LABEL is specifically designed/sized to fit into AD SIGN 5Y related INFORMATION PLACEMENT AREA(s) as shown; wherein STEP 880. USER 500 displays configured AD SIGN 5Y for advertisement purposes; in (an optional) STEP 890, if AD PRODUCT 5 contained multiple LABEL STOCK sheets, STEPS 800 thru 890 could then be repeated. Additionally instead of the printed LABEL STOCK portion being intended for placement onto an AD) SIGN it could instead be intended for placement onto an AD DISPLAY/PRODUCT, furthermore AD PRODUCT 5 or components thereof could be packaged with said AD DISPLAY/PRODUCT.

Figure 5F:
Figure 5G:

FIGS. 5G-1 thru 5G-3 show a webpage screenshot similar to one that might be seen by USER 500 during the FIG. 8 set-up process, wherein FIG. 5G-1 a USER would enter a qualifying SIGN related UPC CODE; and wherein FIG. 5G-2, a USER would then select an ELECTRONIC TEMPLATE; and wherein FIG. 5G-3, the USER would then enter the phone numbers to ELECTRONIC TEMPLATE, next submitting to print the LABEL STOCK, where then preferably a preview of the DATA GROUPS to be printed would be made available for the USER to approve, followed by printing said DATA GROUPS to said LABEL STOCK (as similarly shown in FIGS. 5B, 5C and 5D). Methods of looking up and providing information for print through ELECTRONIC TEMPLATES should be considered non-limiting and can be achieved using any number of methods and user/system interfaces, for example the ELECTRONIC TEMPLATE could be a print ready PDF document with/without customizable forms/fields. Methods similar to those depicted in FIGS. 5G-1-5G-3 could also apply to processes as described in FIGS. 3-4, 9-10, 16-17.

As related to FIG. 5E, instead of DATA GROUP 5L-2 being cut-away and applied to AD SIGN 5Y, either DATA GROUP 5L-1 or 5L-3 could have instead been used; in another option DATA GROUP 5L-1 and/or 5L-3 could have been applied to another AD SIGN configured with an AD AREA similar to AD SIGN 5Y. In alternative options, the ELECTRONIC TEMPLATE output data can be organized into other pre-defined DATA GROUP(s), for purposes that allow the USER to arrange and apply printed DATA GROUP cutaway LABELS onto related SIGN, for example, configured AD SIGN 5Y', as shown in FIG. 5F, shows FIG. 5C DATA GROUP 5L'-3 and 5L'-4 cutaway labels pieced together and applied, as a one larger-font phone-number label, to AD SIGN 5Y'; in another example, configured AD SIGN 5Y", as shown in FIG. 5G, shows all FIG. 5D DATA GROUP cutaway LABELS pieced together and applied, as one large-font contact information label, including phone number and web-address, to AD SIGN 5Y". In other embodiments, multiple DATA GROUPS intended for application to a given and/or multiple SIGN(s) could be printed on more than one LABEL STOCK sheet, as similarly depicted in FIGS. 5F-5G. One primary advantage as related to the invention embodiments as discussed in FIG. 5 is that a single AD PRODUCT 5 in combination with any one of/too many ELECTRONIC TEMPLATES can be used to create custom LABELS (contact/advertisement information labels) for several different SIGN types/sizes. As an alternative to said LABEL STOCK being comprised of peel-away adhesive LABEL it could instead be comprises of (peel-away) static cling film; whereas said static cling film or portions thereof could be applied to any applicable surface, including, signs, windows, walls, white boards, etc. In another alternative said LABEL STOCK could instead comprise a printable substrate/surface with magnetic backing; whereas said magnetic label stock or portions thereof could be applied to applicable surfaces, i.e. metallic appliances and other metallic surfaces. Furthermore said LABEL STOCK could be used to create printed LABEL-SIGN(s), using methods similar to those depicted in FIGS. 9 and 10, where said LABEL-SIGN could be applied to any applicable surface for display, e.g. windows, walls, vehicles, etc.; and where, said LABEL-SIGN could be a type of advertisement sign, similar to product sale signs, event promotion signs, service center promotion signs, other outdoor/indoor related signage, etc. In cases of double sided AD SIGN(s) the ELECTRONIC TEMPLATE, could be designed to produce printed LABELS for application to both sides of said double sided AD SIGN.

In FIG. 5, as an alternative to the UPC CODE being entered in order to present matching ELECTRONIC TEMPLATE(s), instead dimension data (e.g. height, width, shape, etc) of the intended label placement area(s) could be entered, in order to retrieve qualifying ELECTRONIC TEMPLATE(s); and/or product related names, descriptions and/or associated id(s) could be entered to retrieve qualifying ELECTRONIC TEMPLATES. In another alternative. AD PRODUCT 5, including related ELECTRONIC TEMPLATES, could be intended for LABEL creation as specific to an AD SIGN, sign, line of signs, product, line of products and/or combinations/variations thereof. AD PRODUCT 5 makes available a product and method that allows a USER to create professional, legible and cut-to-size labels intended for application to related (SIGN) products, e.g. SIGNS, FOR SALE SIGNS, GARAGE SALE SIGNS, YARD SALE SIGNS, FOR RENT SIGNS, FOR INFORMATION SIGNS and other For Display products.

Figure 9A:
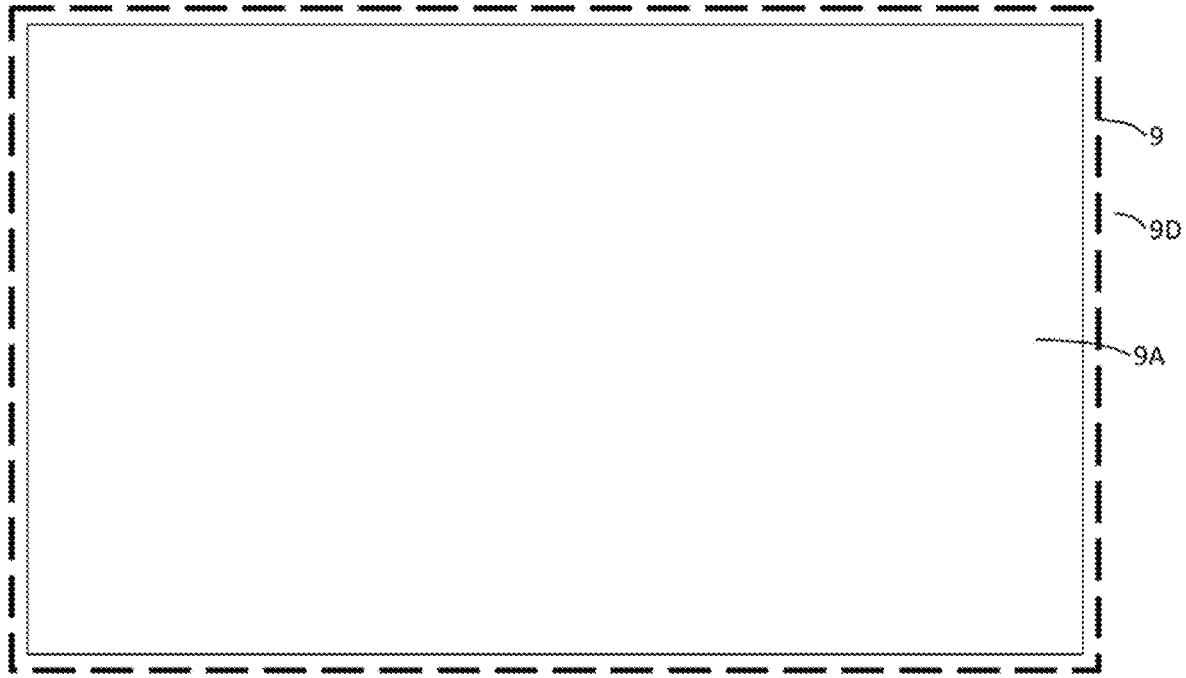
FIG. 9A depicts an AD PRODUCT bundle, comprising blank SIGN STOCK; wherein FIG. 9B said SIGN STOCK is additionally configured with printed material, creating a PRINTED SIGN

FIG. 9A, shows an AD PRODUCT 9 bundle comprising SIGN STOCK 9A, preferably made from weather/water/UV resistant material (e.g. PE, PS, Vinyl, plastic, etc) and sized as such so as to be standard printer printable; wherein steps, as depicted in FIG. 11, USER 500 in STEP 1100, reads available INSTRUCTIONS 11D, which in STEP 1110, instruct USER 500 to look-up a provided web-address related webpage; wherein STEP 1120, said webpage allows USER 500 access to at least one, SIGN STOCK 9A related ELECTRONIC TEMPLATE; wherein STEP 130, USER 500 would set/enter standard/custom (contact) data to said ELECTRONIC TEMPLATE; in STEP 1140, wherein STEP 740, USER 500 loads at least one sheet of LABEL STOCK 31 to a preferably local printer and prints said ELECTRONIC TEMPLATE related DATA GROUP 9L onto LABEL STOCK 9A; wherein STEP 1150, USER 500 displays configured SIGN STOCK 9A, a type of PRINT DIRECT SIGN, for advertisement purposes; in (an optional) STEP 1160, if AD PRODUCT 9 contained multiple SIGN STOCK sheets, STEPS 1100 thru 1160 could then be repeated.

Figure 9B:
Figure 10A:
FIG. 10A depicts an AD PRODUCT bundle, comprising pre-printed SIGN STOCK; wherein FIG. 10B said SIGN STOCK is additionally configured with printed material, creating a PRINTED SIGN.
Figure 10B:
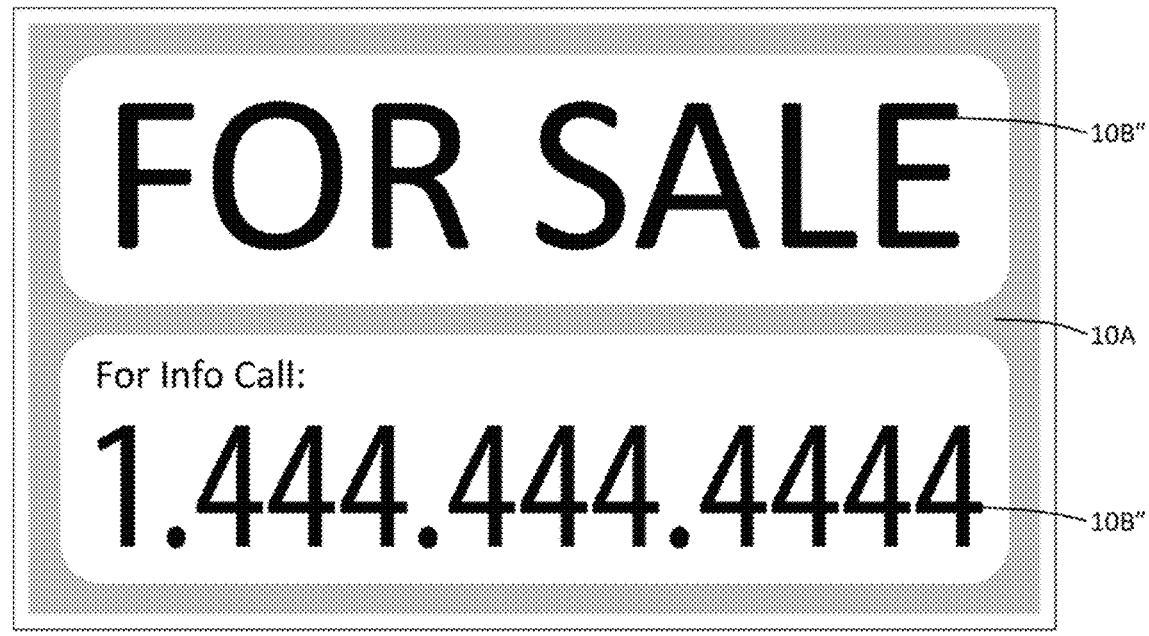

FIG. 10A, shows an AD PRODUCT 10 bundle comprising SIGN STOCK 10A that is pre-configured with INFO AREAS 10B and 10B'; whereas, similar steps as those depicted in FIG. 9 would apply to FIG. 10, except FIG. 10 related DATA GROUP information is printed to INFO AREAS 10B and 10B', as shown in FIG. 10B. This option as compared to the option presented in FIG. 9 allows for SIGN STOCK to already be pre-configured with (standard, reflective, special ink, etc) text/graphics. Alternatively, INFO AREAS could vary in number, type, configuration, shape, size, arrangement and/or in complimentary graphics/text. In other embodiments, said pre-configured graphics/text/information could include instructional, marketing, advertising and/or promotional type information; for example, AD PRODUCT related SIGN STOCK could be pre-configured as a generic GARAGE SALE SIGN, complete with blank AD AREA (similar to FIG. 3, AD SIGN 3A) and optional (bundled/direct-printed) INSTRUCTIONS, where INSTRUCTIONS could advise a USER of the options to either manual configure (contact/sales) information to said AD AREA and/or lookup an ELECTRONIC TEMPLATE to directly print (custom) information to said pre-configured SIGN STOCK sheet, with the printed option instantly making available a durable, legible and professional looking (custom) GARAGE SALE SIGN.

FIG. 12 shows INSTRUCTIONS similar to what could be included with AD PRODUCTS as depicted in FIGS. 1 and 2.

FIG. 13 shows INSTRUCTIONS similar to what could be included with AD PRODUCTS as depicted in FIGS. 3 and 4.

FIG. 14 shows INSTRUCTIONS similar to what could be included with AD PRODUCTS as depicted in FIGS. 5 and 16.

FIG. 15 shows INSTRUCTIONS similar to what could be included with AD PRODUCTS as depicted in FIGS. 9, 10 and 17.

FIG. 1-4 related AD SIGN headings should be considered non-limiting and could include headings such as, FOR SALE, FOR LEASE, FOR RENT, FOR INFORMATION, NO TRESPASSING, YARD SALE, GARAGE SALE, ITEMS FOR SALE, OPEN/CLOSED, OPEN HOUSE, HOUSE FOR SALE, FOR SALE BY OWNER, etc.

The AD PRODUCTS as depicted in FIGS. 1-2, 4, 9-10 are a practical product alternative for retailers, who instead of displaying multiple AD SIGN types (taking up valuable retail space) could rather stock to display (a single) AD PRODUCT, a product that makes a plethora of signage-type products available for the end consumer to create.

As related to FIG. 3-4, 9-10, in STEPS 720/1120, alternative to ELECTRONIC TEMPLATES being made available to USER 500 for selection at said website, said AD PRODUCT related INSTRUCTIONS could contain at least one id (e.g. id, unique id, barcode human readable id, product id, referral id, activation id, id, etc) as related to at least one ELECTRONIC TEMPLATE; whereas said INSTRUCTIONS would instruct USER 500 to enter at least one of said ids to said website to retrieve said ELECTRONIC TEMPLATE(s), i.e. AD PRODUCT related INSTRUCTIONS similar to those depicted in FIG. 15 as related to FIG. 9 could rather instruct the USER to enter (10) to retrieve FOR SALE SIGN related ELECTRONIC TEMPLATES or (20) to retrieve GARAGE SALE SIGN related ELECTRONIC TEMPLATES, which upon entry the USER would then select/set ELECTRONIC TEMPLATE and print related sign for display. Furthermore, said INSTRUCTION related/embedded ids could double as and/or independently act as a referral/credit tracking type of elements.

Figure 16A:
FIGS. 16A/B respectively depict a front and back view of a packaged AD PRODUCT (similar to that of FIG. 5), showing a clear document bag (w/ hang hole) containing a marketing insert (as seen in front view FIG. 16A) and instructional insert (as seen in back view FIG. 16B), and not seen is (weatherproof) LABEL STOCK material is located between said inserts.

FIG. 16A/B shows a front and back of a packaged AD PRODUCT, similarly to that of FIG. 5a, showing a clear document bag (w/ hang hole) which contains a marketing insert (as seen in the front view FIG. 16A) and an instructional insert (as seen in the back view FIG. 16B), it is assumed that LABEL STOCK material is located between both said inserts. In an effort to explain to a potential USER how the invention works, marketing insert as shown in FIG. 16A shows an example of a typical for sale SIGN complete with hand scribed contact information, including some corrections (which when using permanent marker/pen is typical), as compared to the bottom picture, which shows a SIGN configured using said AD PRODUCT, where a clearly printed LABEL containing printed contact information is configured onto said SIGN, via a process similar to that described in FIGS. 5 and 15. The instructional insert, as shown in FIG. 16B, instructs on how to use the AD PRODUCT enclosed LABEL STOCK and related online ELECTRONIC TEMPLATES to create a custom LABEL(s) for application to any one of many third party (advertising) signage/products/surfaces.

Figure 17A:
FIGS. 17A/B depict a front and back view of a packaged AD PRODUCT (similar to that of FIGS. 9-10), showing a clear document bag (w/ hang hole) containing a marketing insert (as seen in front view FIG. 17A) and instructional insert (as seen in back view FIG. 17B), and not seen is (weatherproof) SIGN STOCK material is located between said inserts.
Figure 18A:
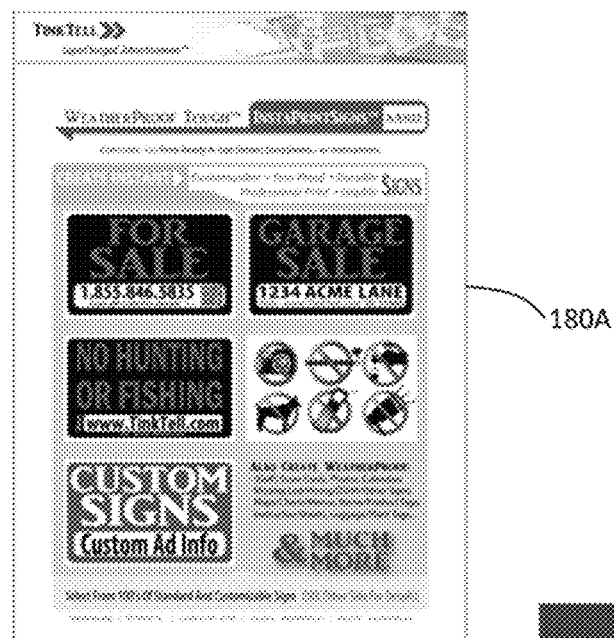
FIGS. 18A/B depicts a visual contrast, with regards to retail space required; to display a standard signage plan-o-gram as compared to (a single) replacement, signage centric, AD PRODUCT.
Figure 18B:
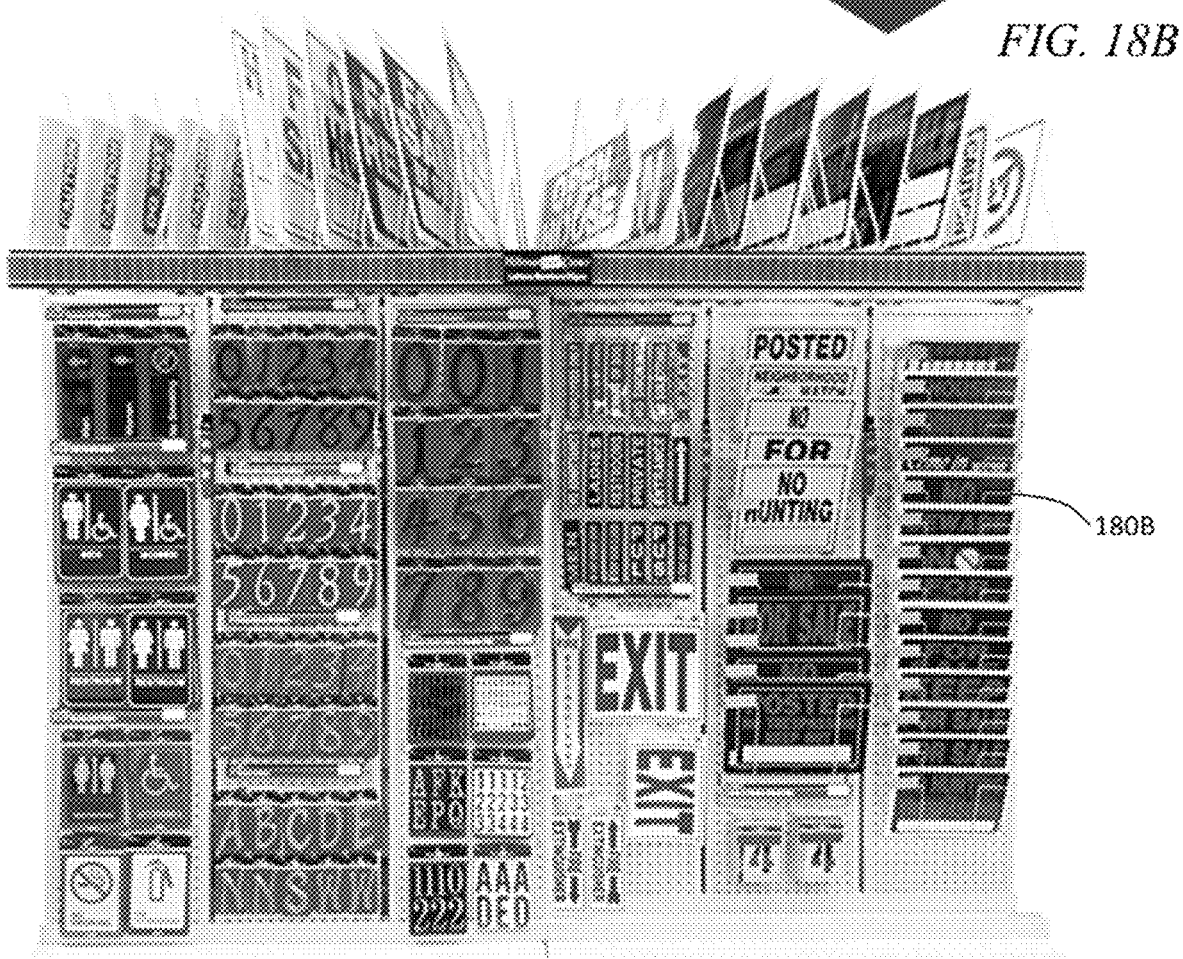

FIG. 17A/B depicts a front and back of a packaged AD PRODUCT, similarly to that depicted in FIGS. 9 and 10, showing a clear document bag (w/ hang hole) which contains a marketing insert (as seen in the front view FIG. 17A) and instructional insert (as seen in the back view FIG. 17B), it is assumed that SIGN STOCK material is located between both said inserts. In an effort to explain to a potential USER how the invention works the marketing insert shown in FIG. 17A shows several samples of SIGNS that can be made using said AD PRODUCT and then goes on to explain that many other SIGNS and products can also be made using same said AD PRODUCT. The instructional insert, as shown in FIG. 17B, instructs on how to use the AD PRODUCT enclosed SIGN STOCK and related online ELECTRONIC TEMPLATES to create (custom) weatherproof signage/documents, some as detailed in the instructional insert.

As related to an AD PRODUCT similar to that depicted in FIG. 17 A/B. It is well known that weatherproof printable sheet-stock can be purchased in bulk (typically at quantities of 50 or more sheets) with a manufacturing cost of upwards to a US-Dollar per sheet which can be very pricy, especially for an end user just looking to make a couple signs, a problem solved by said AD PRODUCT, which makes available a product and method consisting of very specific instructions, a small quantity of weatherproof sheet-stock and electronic templates all packaged in a mass-produceable and retail ready product providing the end user with an inexpensive (comparable pricing to existing for sale/advertising signs) AD PRODUCT that allows them to instantly and conveniently create any one of several professional/durable signage products. A similar problem/solution statement, as previously explained, could also be applied for LABEL STOCK related AD PRODUCTS such as that depicted in FIG. 16A/B.

A PROBLEM STATEMENT—retail space for any store is a premium, but especially so for smaller stores, and the competition by suppliers/manufacturers/distributors to place product in said retail spaces is fiercely competitive, especially with signage related products, because there are so many different types/variations of signage products and related accessories available; also, signage products are typically not fast moving in terms of high-volume (turn around) sales, resulting in many stores opting to either carry a very limited signage offering, or in many cases, deciding not to carry signage products at all. AD PRODUCT 180A, as similarly depicted in FIGS. 15 and 17A/B, makes available a powerful solution to the previously said PROBLEM STATEMENT, by making available a product with related methods that provide (retailers) distributors the option of carrying a single and highly versatile product that allows the end consumer to create a plethora of signage products, including signage products as seen in PLAM-O-GRAM 180B. The adhesive numerals seen in PLAN-OGRAM 180B are no longer needed when using AD PRODUCT 180A, because the numerals are added to the PRODUCT 180A related SIGN STOCK sheet during the printing process. Various and complimentary versions of AD PRODUCT 180A, varying in areas such as SHEET STOCK size and counts; related ELECTRONIC TEMPLATES and (display) accessories, etc., could also be carried by (retailers) distributors, expanding their product offering while still maximizing retail/stock space.

ELECTRONIC TEMPLATES, as applicable, should be considered non-limiting with regards to the type; configuration; arrangement; data stored therein; data provided therein; related user GUI(s); data request forms; calculations performed and any resultant data outputs; graphics/text; related instructions; provided file(s); related data manipulations, etc. ELECTRONIC TEMPLATE related and printed DATA GROUP(s), as applicable, should be considered non-limiting with regards to, number of groups produced; content and/or arrangement as stand-alone or in relation to one another. How ELECTRONIC TEMPLATE(s) is/are accessed, as applicable, should be considered non-limiting with regards to how they are accessed, including access by way of, a service website; bundled software; sent software; downloaded software; computing terminals; (mobile) application; etc. ELECTRONIC TEMPLATES (in the form of TEMPLATE-SW and/or instructions/links on how to receive TEMPLATE/TEMPLATE-SW) could be sent/retrieved by way of, text-message; SMS; email fax; mail; call-in services; etc.

Furthermore, DATA GROUP(s) should not be considered limited with regards to related, text type; style; content/arrangement; graphics/pictures; shape/size; etc. Also, as related to invention embodiments where DATA GROUP(s) are printed and cut from LABEL STOCK, such as depicted in FIG. 5, related CUT HERE LINE(s) could instead be omitted or be configured in a different style/shape, with/without cutting instructions.

The AD PRODUCTS related LABEL/SIGN STOCK, as applicable, should be considered non-limiting with regards to, piece count; type; shape; material type/composition (e.g. weather/water proof, UV-resistant, polystyrene, polypropylene, vinyl, plastic sheeting, paper, chemical treatment, plastic blends, static cling film, surface treated film, film, etc); pre/post print inks/dies/etc (i.e. printed inks could be fluorescent, reflective, UV-resistant, water resistant, weatherproof, etc.); surface treatments; score/perforation lines; design; peel-away label types/counts/shapes; pre-configured graphics, text, pictures, etc; adhesive (i.e. label adhesive could be made to be removable, permanent, temporary, weatherproof, waterproof, heat/cold resistant, chemical resistant, etc.). Furthermore LABEL/SIGN STOCK could instead be (treated) card/paper stock, etc. Also LABEL/SIGN STOCK related material could be as such so as to allow a USER to write/scribe thereto, using implements such as markers/pens/pencils; and still LABEL/SIGN STOCK related and printed DATA GROUPS could include dedicated areas intended to be written to and/or have labels or other items applied to.

Alternatively, SIGN/LABEL STOCK, as applicable could include portions intended for a USER to scribe on, where said surface portion could be treated as such so as to allow for erase/rewrite of scribed material/inks/lead. SIGN/LABEL STOCK in another alternative could vary in size, including standardized print/paper sizes, e.g. 8.5" by 14", 11" by 17". A1-A4, B and C Sizes, etc. Furthermore, SIGN STOCK, as applicable could include portions intended for placement of removable items (e.g. labels, tags, stickers objects, accessories, etc), where said items could attach to said portion by way of mechanical attachment, static cling, magnetic attraction, Velcro, etc.; and/or said SIGN STOCK could be pre-configured with at least one score/perforation line, allowing for SIGN STOCK portions to bend/break-off about at least one said line; wherein embodiments where said portions bend about said line it is preferred that the material be resilient (less prone to fracture); and wherein embodiments where said portions break off about said line it is preferred that the material be prone to facture when a tearing force (or transverse force) is applied but resilient when flexion forces (forces as would be seen during the printing process when SIGN STOCK sheets are moved through printer rollers) are applied.

As an alternative to LABELS being intended for application to signs, said labels could instead be intended to be applied to objects, items, surfaces, etc. i.e. plaques, easels, displays, walls, vehicles, appliances, windows, etc. Furthermore LABELS could be reverse printed onto clear film adhesive/static-cling label stock so when applied to and inside clear surface, such as a window or plastic the LABEL image appears normally as seen from an outside view of said surface.

In alternative embodiments AD PRODUCT related INSTRUCTIONS could instead instruct a USER to use available software to access ELECTRONIC TEMPLATES; and/or they could instruct said USER on how to obtain said software by electronic transmission (e.g. email mail, text message, via an application, etc), internet download, regular mail, etc. Furthermore, said INSTRUCTIONS could instruct a USER to use/obtain specific software in order to access ELECTRONIC TEMPLATES and/or create DATA GROUP(s) for print to LABEL/SIGN STOCK. Furthermore still, said INSTRUCTIONS could communicate different ideas, creation ideas. ELECTRONIC TEMPLATES, etc., i.e. they could instruct a USER on how to create custom and standard labels/signs and/or labels/signs intended for placement onto certain objects and/or other advertisement items and/or surfaces (e.g. walls, windows, etc.). Additionally, said INSTRUCTIONS could be bundled with AD PRODUCT, configured onto items contained in AD PRODUCT, configured onto AD PRODUCT related packaging, etc. In other embodiments INSTRUCTIONS could simply refer a user to a site/location, i.e. a website, to access more detailed instructions.

As related to FIGS. 6-8, 11-12 and/or any other process related FIG(s) as presented in the current application, it is noted and as appropriate, the steps described could be re-arranged, collapsed, expanded, removed, occur concurrently, occur simultaneously, have other steps added, be further broken down into sub-steps, etc, to achieve the same generally intended process and/or outcome.

In an alternative embodiment when a USER is setting an ELECTRONIC TEMPLATE an additional step could be added, requiring a USER to first enter the AD PRODUCT type and/or a related ID so as only to have presented said AD PRODUCT specific web content, i.e. ELECTRONIC TEMPLATES.

As an another option instead of the ELECTRONIC TEMPLATES allowing a USER to set custom data/information instead the templates could already be set and made to be non-editable, creating predefined LABELS/SIGNS such as selected from the following sign types, open/close, keep out, keep off grass, no parking, reserved parking stop, exit, help wanted, restroom, gentleman, women, ladies, men, pull, employees only, no solicitation, no smoking, private, fire extinguisher, no parking, apartment for rent, no trespassing/hunting/fishing, etc.

As further alternatives, LABEL/SIGN STOCK could be intended for placement onto and/or (inserted) into another (advertisement display) item, and/or said item/product configured designated placement-area, items such as, nameplates, display, sleeves, containers, books, post cards, fliers, pamphlets, booklets, documents, magazines, menus, pamphlets, notebooks, notebooks, planners, information signs, for sale signs, for rent signs, for lease signs, yard sale signs, organization informational signs, event information signs, service information signs, product information signs, hiring information signs, space available signs, no trespassing signs, open/closed signs, open house signs, house for sale signs, for sale by owner signs, private road signs, vacancy information signs, general information signs, location information signs, generic signs, advertisement signs, signs, score cards, instruction sheets, outdoor signage, maps, charts, menus, business cards, boxes, luggage/plant tags, rulers, bookmarks, greeting cards, calendars, photo/collages, moving boxes, packaging, product packaging, products, luggage, envelopes, briefcases, backpacks, purses, wallets, garnet bags, gym bags, personal bags, any bag, document containers, product cases, PDAs, phones, mobile computers, electronic books, tablet computers, music players, protective cases, bulletin boards, cards, key chains, dog collars, kid bracelets, jewelry, display boards, floor/counter displays, sign holders, counter display sign holders, floor display sign holders, hanging sign holders, product displays, services/information/event displays, displays, advertisement displays, personal accessories, skates, roller blades, sporting equipment, electronic equipment, mobile electronic equipment, tools, motorized tools, home furnishings, furniture, kitchen items, desk/office items, sales items, items that could be lost or stolen, motorized vehicles, bikes, scooters, nonmotorized vehicles, scrap books, scrapbook pages, photos, photo pages, photo album, catalog, catalog pages, book, booklet, booklet pages, inserts, brochures, documents, literature objects, advertisement objects/items, objects/items and/or combinations and/or variations thereof; furthermore, in alternative embodiments, any applicable and previously said item could also be created using any of the invention related products/methods described in the current application.

AD PRODUCTS, as appropriate, alternatively:
1. Are non-limiting in package type and configuration.
2. Could comprise any number of parts/processes as depicted in any of the invention embodiments.
3. Could be bundled with other parts and/or contain multiple parts.
4. Could be bundled with accessories, some of which could be intended for assembly by USER.
5. Could be comprised of many packaged/bundled parts intended for assembly and/or include part(s) intended for use separately, e.g. display related accessories.
6. Could be bundled with other AD PRODUCTS, whereas said other AD PRODUCTS could be intended for use interdependently and/or independently.
7. Could contain at least one part, where said part could be fabricated from paper-based product, plastics, metals, composites, chemicals/compounds and variations and combinations thereof; furthermore and more specifically said part could be fabricated from polymers, rubbers, magnets, magnetic strips, static cling material, Velcro®, static film material, peel-away adhesive backed materials, writable materials, re-writable/erasable materials and variations and combinations thereof; furthermore still, said part could be any form of software media.
8. Could consist of at least one component/part as selected from a group of mechanical components, electric components, computing components, chemical components and variations and combinations thereof.
9. Related packaging/items could additionally be configured with and/or contain any arrangement of complementary graphics, including art, attached objects, marketing/advertising information, information, instructions, text and/or variations and/or combinations thereof.
10. Could be bundled with accessory parts such as, (peel-and-stick) alpha-numeric characters; labels and/or tags that could either be permanently, temporarily or re-attach-ably applied; alpha-numeric stencils; various packaging related materials; writing utensils, such as Dry Erase® pens; software, such as label creation software; print ready label stock; pre-printed label stock; mounting and display materials/parts; tools, equipment and/or hardware; other accessories; other products and variations and combinations thereof.
11. Could have at least one product barcode located on AD PRODUCT associate packaging/contents, or product barcode(s) could be omitted all together.
12. Could comprise contents configured with graphics and dedicated areas for a USER to include custom graphics/text/objects/items/etc.
13. Could be bundled with (ideally related) third part signage, displays, advertisement displays, advertisement products, products, objects, items and variations and combinations thereof.

Alternatively, any of the configured SIGNS/LABELS as created using any of the presented AD PRODUCT embodiments could instead be manufactured as such, to be made available for sale/distribution.

Alternative embodiments are also created by mix and matching concepts, methods and/or components from any of the embodiments/methods/alternatives as described in the current application.

An alternative and next generation AD PRODUCTS, also known as FOR INFORMATION PRODUCTS would incorporate both SYSTEM LINKED and CONTACT ELEMENT GROUP related ELECTRONIC TEMPLATE and/or DATA GROUP data/processes, where CONTACT ELEMENTS such as those similarly depicted on the FIG. 17A marketing insert, showing a GARAGE SALE SIGN example that includes a SYSTEM LINKED look-up web-address and related ID, and a FOR RENT SIGN that includes a SYSTEM LINKED QR Code. Supporting specifications for these alternative invention embodiments, including other types of FOR INFORMATION PRODUCTS are disclosed in U.S. Provisional Application No. 61/632,397, filed Oct. 15, 2011, entitled SYSTEM LINKED FOR INFORMATION PRODUCT INCLUDING DISTRIBUTION, MARKETING AND ADVERTISING METHODS, of which an application summary/abstract is as follows:

A for information product or FIP, such as a for sale sign and advertisement signs/products, configured with system (services) linked contact information that make available powerful applications and/or services that provide FIP related computing-system centric tools, mechanisms and/or media which aid said FIP related administrators.

Also disclosed is a method of crediting FIP distributors for system services (accounts) set and as related to said distributor distributed FIP.

Further disclosed is a method by which a picture is taking of a FIP and submitted for processing to initiate pre-defined system response(s).

Still further disclosed is a method by which vendor displayed FIP(s), configured with referral information, can be referenced by viewers to initiate system response(s), and whereby credit as related to a said viewer referral is preferably tracked as related to up-line distributors, including said vendor.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

The invention claimed is:

1. An improved method of producing a personalized printed product, comprising:
purchasing from a physical retail store a retail store product comprising physical printable material and product instructions, with the product instructions providing information on how to access an electronic template for the printable material;
accessing the electronic template via a computer system, with the accessing of the template comprising inputting an identifier into the computer system, with the identifier and the template being specific to a type of prefabricated object;
entering personalized data into the electronic template via a user interface in a computer device in the computer system; and producing a personalized printed product, with the producing of the printed product comprising; printing printed data comprising the personalized data onto the printable material using the electronic template to produce printed material and securing at least a portion of the printed material to a prefabricated object, wherein the prefabricated object is the type of prefabricated object.

2. The method of claim 1, wherein a single user performs the method.

3. The method of claim 1, wherein the printed product is a yard sign, and wherein the method further comprises displaying the printed product in an outdoor area.

4. The method of claim 1, wherein the printed product is a for-sale sign.

5. The method of claim 1, wherein the printable material comprises label stock, and wherein the producing of the printed product comprises adhering a printed portion of the label stock to the prefabricated object.

6. The method of claim 5, wherein at least after the printing of the printed data onto the label stock, the label stock comprises a cut guide line that defines the printed portion of the label stock that is shaped to fit a designated area of the prefabricated object, wherein the producing of the printed product further comprises separating the printed portion of the label stock from a remaining portion of the label stock along the cut guide line and applying the printed portion of the label stock to the designated area of the prefabricated object.

7. The method of claim 5, wherein the method further comprises purchasing the prefabricated object from the same retail store as the retail store product.

8. The method of claim 7, wherein the prefabricated object is displayed with the retail store product at the retail store.

9. The method of claim 7, wherein the prefabricated object is bundled with the retail store product at the retail store.

10. The method of claim 1, wherein the personalized data comprises user contact information.

11. The method of claim 1, wherein the printed data comprises system linked data, and wherein the system linked data is configured to initiate a predefined computer system action upon being used to interact with the computer system.

12. The method of claim 1, wherein the printing is performed using the computer device and a standard home and/or office printer.

13. The method of claim 1, wherein the printing of the printed data onto the printable material comprises printing a cut guide line on label stock, wherein the cut guide line defines a printed portion of the label stock that is shaped to fit a designated area of the prefabricated object, wherein the producing of the printed product further comprises separating the printed portion of the label stock from the remaining portion of the label stock along the cut guide line and applying the printed portion of the label stock to the designated area of the prefabricated object.

14. A method of facilitating production of a personalized printed product, comprising:
providing to a physical retail store product instructions, with the product instructions providing information on how to access an electronic template that is specific to a type of prefabricated object sold at the physical retail store;
receiving a computer-readable request to access the electronic template via a computer system, with the request comprising an identifier that is specific to the type of prefabricated object; and
providing access to the electronic template via the computer system, with the providing access to the electronic template using the identifier, with the electronic template being configured to receive personalized data into the electronic template via a user interface in a computer device in the computer system with the template being configured for using the template to print the personalized data onto printable material to produce printed material and prepare the printed material for being secured to a prefabricated object that is the type of prefabricated object to produce a personalized printed product.

15. The method of claim 14, wherein the method further comprises providing the prefabricated object to the physical retail store.

16. The method of claim 14, wherein the method further comprises providing the printable material to the physical retail store.

17. A production system for producing a personalized printed product, comprising:
a retail store product displayed in a physical retail store, with the retail store product comprising product instructions and one or both of physical printable material or a prefabricated object that is a type of prefabricated object, with the product instructions providing information on how to access an electronic template for the printable material to be applied to the prefabricated object, wherein the production system is configured to operate by performing the following computerized acts in conjunction with the retail store product:
maintaining the electronic template in a computer system;
receiving a computer-readable request to access the electronic template, with the request comprising an identifier that is specific to the type of prefabricated object; and
providing access to the electronic template, with the providing access to the electronic template using the identifier, with the electronic template being configured to receive personalized data into the electronic template via a computer user interface in a computer device with the template being configured for using the template to print the personalized data onto the printable material to produce printed material and prepare the printed material for being secured to the prefabricated object to produce a personalized printed product.

18. The production system of claim 17, wherein the production system further comprises the prefabricated object displayed in the retail store, wherein the printable material is label stock, and wherein the prefabricated object and the label stock are configured for the label stock to be adhered to the prefabricated object.

19. The production system of claim 17, wherein the personalized printed product is a personalized sign.

20. The production system of claim 17, wherein the production system is configuring for printing using the computer device and a standard home and/or office printer.

* * * * *